US011251631B2

(12) United States Patent
Howard et al.

(10) Patent No.: US 11,251,631 B2
(45) Date of Patent: Feb. 15, 2022

(54) POWER SUPPLY FOR ELECTRONIC DEVICES FOR REMOTE LOCATIONS

(71) Applicant: Chrome City Productions, LLC, Greenville, SC (US)

(72) Inventors: Shane Howard, Greenville, SC (US); Rick Wrenn, Greenville, SC (US)

(73) Assignee: Chrome City Productions, LLC, Greenville, SC (US)

( * ) Notice: Subject to any disclaimer, the term of this patent is extended or adjusted under 35 U.S.C. 154(b) by 166 days.

(21) Appl. No.: 15/681,061

(22) Filed: Aug. 18, 2017

(65) Prior Publication Data

US 2018/0054075 A1    Feb. 22, 2018

Related U.S. Application Data

(60) Provisional application No. 62/376,449, filed on Aug. 18, 2016.

(51) Int. Cl.
| | |
|---|---|
| *H02J 7/00* | (2006.01) |
| *H02J 7/02* | (2016.01) |
| *H02J 50/10* | (2016.01) |
| *H02J 7/35* | (2006.01) |
| *H02J 7/34* | (2006.01) |

(52) U.S. Cl.
CPC ............ *H02J 7/0044* (2013.01); *H02J 7/025* (2013.01); *H02J 7/342* (2020.01); *H02J 7/35* (2013.01); *H02J 50/10* (2016.02); *H02J 7/00* (2013.01); *H02J 2207/40* (2020.01)

(58) Field of Classification Search
CPC .................. H02J 7/0054; H02J 7/0055; H02J 2007/0062; H02J 7/0044; H02J 7/025; H02J 7/342
USPC ................. 320/101, 103, 107, 108, 113, 115
See application file for complete search history.

(56) References Cited

U.S. PATENT DOCUMENTS

| | | | |
|---|---|---|---|
| 6,870,089 B1 * | 3/2005 | Gray ...................... | H02S 30/20 136/251 |
| 9,698,623 B2 | 7/2017 | Adams et al. | |
| 2008/0125188 A1 | 5/2008 | Huang | |
| 2009/0096413 A1 * | 4/2009 | Partovi .................. | H01F 5/003 320/108 |
| 2009/0128086 A1 | 5/2009 | Lee | |
| 2011/0089894 A1 * | 4/2011 | Soar ....................... | H02J 50/10 320/108 |
| 2011/0204843 A1 * | 8/2011 | Foster .................... | A45C 11/00 320/101 |
| 2014/0265996 A1 | 9/2014 | Djeu | |
| 2015/0216273 A1 * | 8/2015 | Akin ....................... | H02J 50/40 135/16 |

* cited by examiner

*Primary Examiner* — Edward Tso
*Assistant Examiner* — Aaron Piggush
(74) *Attorney, Agent, or Firm* — Kim and Lahey Law Firm LLC; Douglas W. Kim

(57) ABSTRACT

A power supply for providing power and charging electronic devices in remote locations comprising: a case having a device pocket and a power unit pocket; a power unit including a USB port, indicators, power switch, induction coil, battery, solar panel, and power unit controller. A top flap for at least partially covering the device pocket and the power unit pocket; and so that when an electronic device is placed in the device pocket, its internal battery is charged.

16 Claims, 6 Drawing Sheets

POWER SUPPLY FOR ELECTRONIC DEVICES FOR REMOTE LOCATIONS

BACKGROUND OF THE INVENTION

1) Field of the Invention

The present invention relates to a power supply for electronic devices that are in need of charging or power while the user is in a location remote from a traditional power source.

2) Description of Related Art

For reasons not just of convenience, but of safety and even lifesaving utility, the ability to use an electronic device in a remote location is a problem that needs much attention. For example, when hiking, it is common to be miles from roads and other locations where assistance would be readily available. When in need of assistance due to injury, being lost, or other similar situations, being able to contact 911, EMS or even friends or family can be critical to safety and even survival. Unfortunately, if the electronic device such as a cell phone has insufficient power to make such a call, assistance is much more difficult if not impossible to contact.

Even when the cell phone cannot connect to the 911 operator or EMS, the wireless provider may have access to your location by receiving the last known location where your phone had power. This ability is hampered when the user, such as a hiker, turns off the phone unless the phone is in use to "save the battery". The digital trail is then interrupted. When the cell phone is turned on, it can periodically contact a cell tower and perform a handshake. These handshakes can be shared by different cell towers and nodes. In most all cases, the data trail is logged and saved on computers owned by wireless service providers. When someone is missing, it is possible to use that person's cell phone number and have the service provider access the data trail for a specific phone. By having the phone turned on and not "saving the battery", your cell phone can contact cell towers and send and receive handshakes (electronic breadcrumbs) even when the ability to actually have communications is not available. This could allow rescuers to know that you're alive, continue searching, and even help reduce the search area.

Another need, and less life threatening, is for the use of electronic devices for entertainment such as at sporting events. When attending a sporting event live, there is added enjoyment when the fan can also watch the televised event. This ability is possible with services such as NLF.COM/MOBILE and MOBILESPORTSTV.NET. However, streaming video over an electronic device such as a smart phone requires a significant amount of power, thereby sometimes resulting in battery exhaustion prior to the end of the sporting event. It would be advantageous to have the ability to maintain a charge on the phone without necessarily having to carry multiple batteries. Further, external batteries also have the problem that once exhausted also need to be charged.

There have been several attempts to provide remote power supplies that are portable so that they can be taken to remote locations or other locations without traditional power. For example United States Patent Application 2014/0265996 discloses a solar folder comprising a solar module integrated into the side of a solar case. The edges of the solar module are sewn with thread into the side of the solar case. The case is designed for tables and other such electronic devices and cannot serve as a holster or wearable carrying case for the electronic device. Additionally, the folder has to be in a certain orientation for the solar panel to receive light.

Another attempt to address this problem in the industry is shown in United States Patent Application 2008/0125188 that discloses a cellular phone case including a container having a box and a lid to close the opening of the box. A solar cell is provided on the lid to be exposed under sun light. A circuit board is provided in the box and is electrically connected to the solar cell. A battery board is provided in the box and is electrically connected to the circuit board. However, this disclosure does not include the ability to conveniently carry the electronic device or use induction charging with external battery and solar cell charging.

Another attempt is shown in U.S. Pat. No. 9,698,623 which is directed to an integrated mobile phone case and charger for providing both a protective casing and a solar cell for charging the mobile device. The solar cells are on the back piece of the case and on a case that encloses the mobile device preventing full use of the mobile device or charging unless the phone case encloses the case. This invention does not allow use of conventional cases while charging the mobile device. Further, this reference is exclusively reliant on energy from the solar cells. Further, this reference relies on charging port of the mobile device which are vendor specific thereby limiting this reference's utility.

Another attempt is shown in United States Patent Application Publication 2009/0128086 directed to a solar charging apparatus and method for mobile communications. However, this embodiment is limited to a battery and induction coil pre-existing in the mobile device.

Accordingly, it is an object of the present invention to provide for a remote power supply with rechargeable power without the need for traditional power connections in a convenient carrying case.

It is another object of the present invention to provide a remote power supply that is not device vendor specific.

It is another object of the present invention to provide a remote power supply that allows for charging even when the device is in a conventional case.

SUMMARY OF THE INVENTION

The above objectives are accomplished according to the present invention by providing a power supply for providing power and charging electronic devices in remote locations comprising: a case having an electronic device pocket and an electronic housing pocket; the electronic housing including a USB port, external power port, power indicators, power switch, induction coil, battery solar panel, and an indicator, all in electronic communications to a charging unit; a top flap for at least partially covering the electronic device pocket and the electronic housing pocket, so that when an electronic device is placed in the electronic device pocket, its internal battery is charged.

The invention can include a case that has a power unit pocket and a device pocket. The power unit received in the power unit pocket can include a battery, USB port, induction coil and one or more indicators. The indicator can represent or indicate that the power unit is on, the charge level of the battery, if the power unit is charging a device, if the power unit is connected an external power source, if the solar panel is providing power to the device, battery or power unit or any combination.

The solar panel can be carried by a front panel included in the case. A removable electrical connection can connect the solar panel to the power unit allowing the solar panel to be replaced. A device can be received in the device pocket and receive power from the induction coil, USB port or a combination. A processing unit can have program logic and be included in the power unit.

The program logic can also determine if the device is sufficiently charged, and if so, redirect power from the solar panel or from the induction coil to the battery. The program logic can supplement power provided to the induction coil with power from the battery if the induction coil is providing less than 3 watts.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Figure 1:
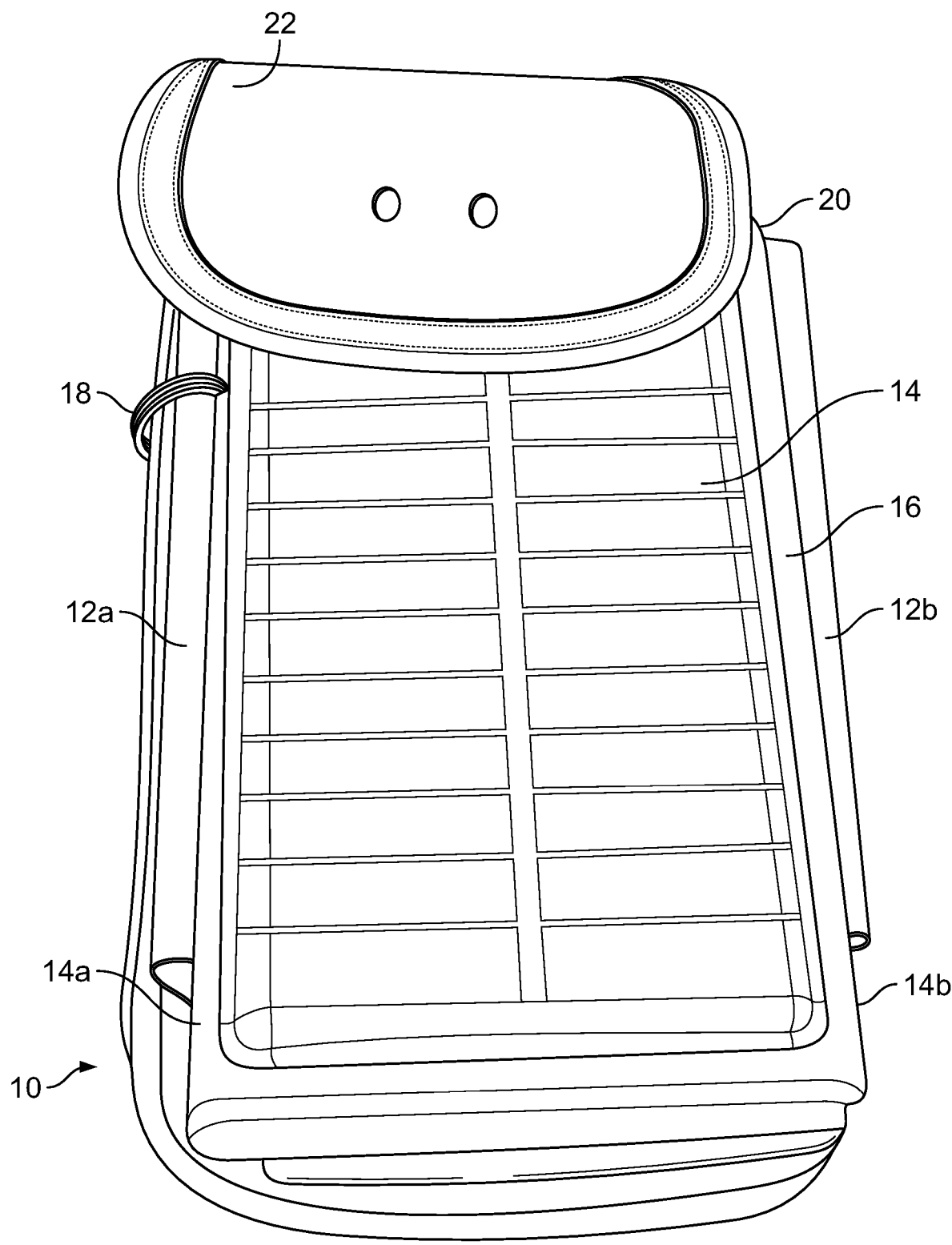
FIG. 1 shows a perspective view of aspects of the invention.

Referring to FIG. 1, a case shown generally as 10 includes and can include a first side 12a and second side 12b. A solar panel 14 can be attached to a front side 16 and include an electrical connection 18 to a power unit in an electronics housing. In one embodiment, the solar panel is removably attached. The case can include an electronic device pocket with openings 14a and 14b defined in the electronic device pocket. A top flap 20 can be included to cover a top opening 22 in the case. The case can include a clip or loop (not shown) for securing the case to a user such as on or with a belt. The electronic device pocket is of sufficient size to allow the device to be received by and removed from the electronic device pocket when the device has a protective case.

Figure 2:
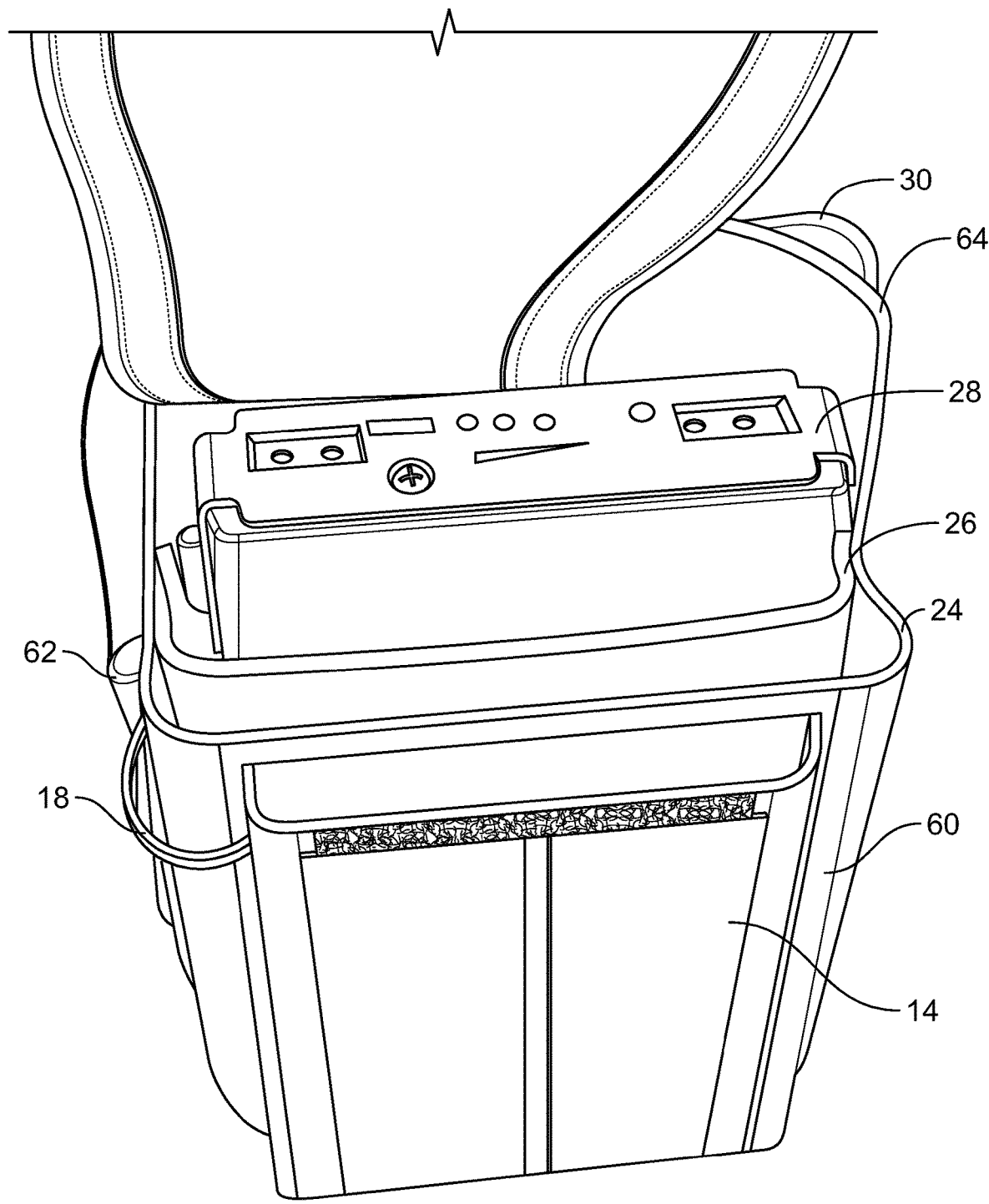
FIG. 2 shows a perspective view of aspects of the invention.

Referring to FIG. 2, the power unit pocket 24 is defined in the case and can be disposed in front of a power unit pocket 26 that can receive a power unit 28. The power unit pocket and the device pocket can be partially or completely closed by the top flap. The case can include a ridged or semi-rigid back panel 30. The solar panel 14 is shown affixed to the front of the case. In one embodiment the solar panel can be removably affixed to the case.

The device pocket is shown defined by the front panel 60 that has the solar panel 14 facing outward from the device pocket. The device pocket 24 is defined by the front panel 60 and divider panel 62. The divider panel has a forward side toward the front panel and a rearward side toward the power unit pocket 26. The power unit pocket is defined by a rear panel 64 and the divider panel. The induction coil within the power unit is facing out toward the device pocket 80 and the device, when placed in the device pocket is 70 mm or less away from the induction coil. The thickness of the divider panel can vary to make this distance 20 mm or less in increments of 1 mm. The electrical connector 18 between the power unit and solar panel can be attached to the power unit in the power unit pocket, extend through the case and attach to the solar panel. Therefore, the solar panel can provide energy when detached from the case.

Figure 3:
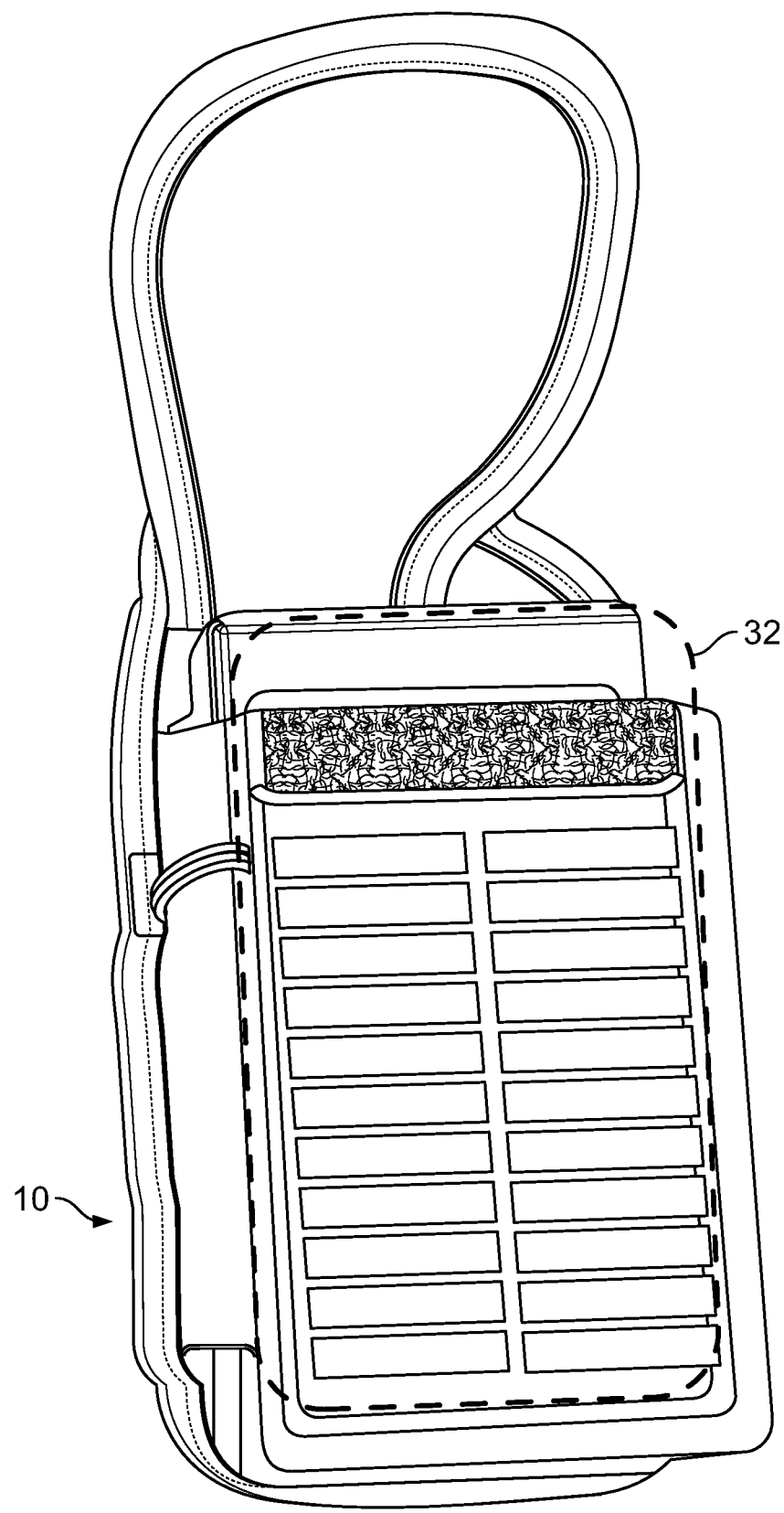
FIG. 3 shows a perspective view of aspects of the invention.

Referring to FIG. 3, the case is shown with a device, such as a cell phone 32, inserted into the device pocket. The device is disposed in the device pocket and between the solar panel and the power unit. An induction coil included in the power unit is therefore placed in sufficient proximity to the device to charge the device. As a result, the case can serve as a charger and carrying case for the device. The device pocket can be configured to receive any number of electronic devices including phones, electronic cigarettes, handheld games, GPS devices, radios, cameras, tablets, medical devices, lights, and the like. These electronic devices can be received in the device pocket with or without protective cases.

Figure 4:
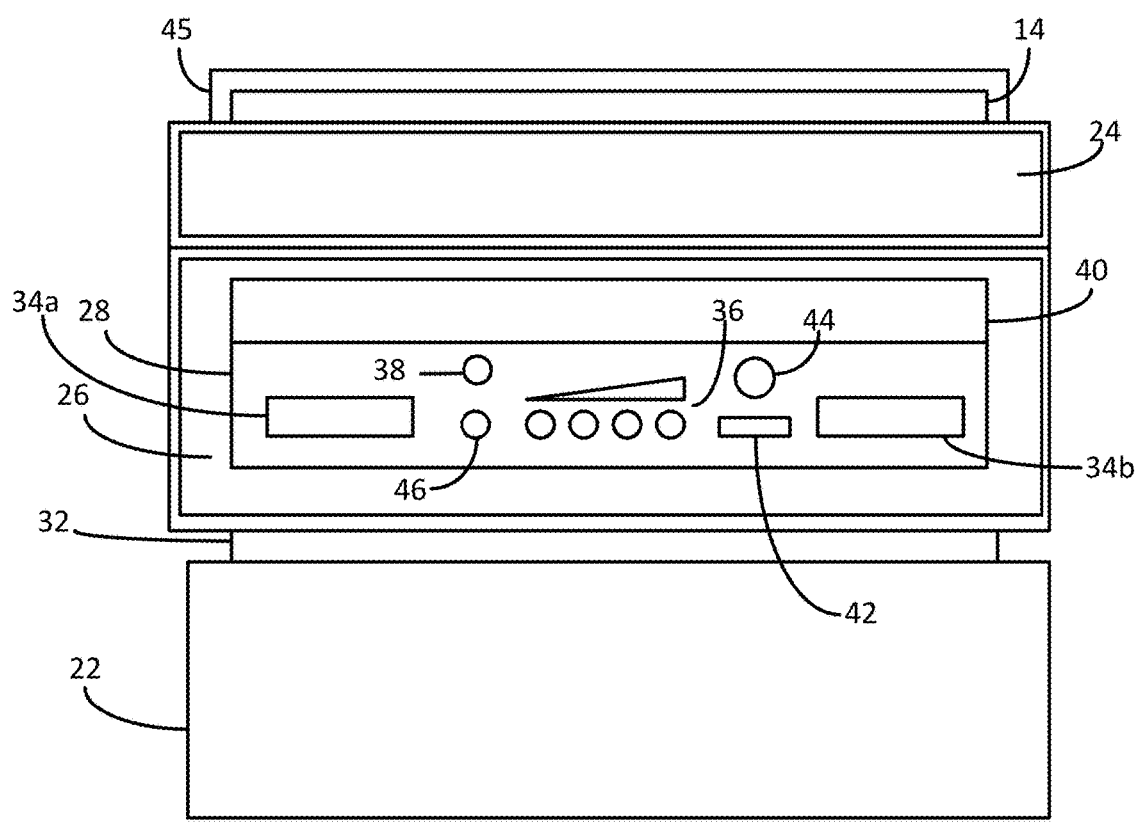
FIG. 4 shows a top view of aspects of the invention.

Referring to FIG. 4, the case 10 is shown from the top view with the front panel facing upward. The top flap can be hingeably attached to the case by hinge 32. The power unit 28 is received in the power unit pocket 26. The power unit housing can include a first USB port 34a and a second USB port 34b. Power indicators 36 can generally represent the power level of one or more batteries contained in the power unit or can represent the power level of a connected device or switch between these two functions. An On/Off switch 38 can activate the charging unit that is contained in the power unit. An induction coil 40 can be attached to the charging unit and can transfer power from the charging unit battery or solar panel to a device received in the device pocket 24. When the device is placed in the device pocket, the induction coil generates an electromagnetic field to transfer energy between one or more batteries in the power unit or the solar panel to the device. The induction coil creates an alternating electromagnetic field that can effectively charge the device. Because the greater distances between the device and the induction coil effect charging, the case keeps the distance between the coils and the device to a minimum, increasing the charging efficiency.

The electronic housing can include an external power source input 42 for receiving power when a traditional power source is available to charge one or more batteries. A indicator light 44 can be included to indicate various functions of the charging unit such as external power source connected, charging, low battery, and the like. The indicator light can be actuated with various indications for the various functions such as solid green when the battery has a sufficient charge, flashing when an external power supply is attached, red when the battery is low, blue when the induction coil is charging an electronic device and other indications and combinations. A power on indicator 46 can be included in the power unit. In one embodiment, a solar panel cover 45 can be included in the case and can cover the solar panel when not in use for additional protection of the solar panel.

Figure 5:
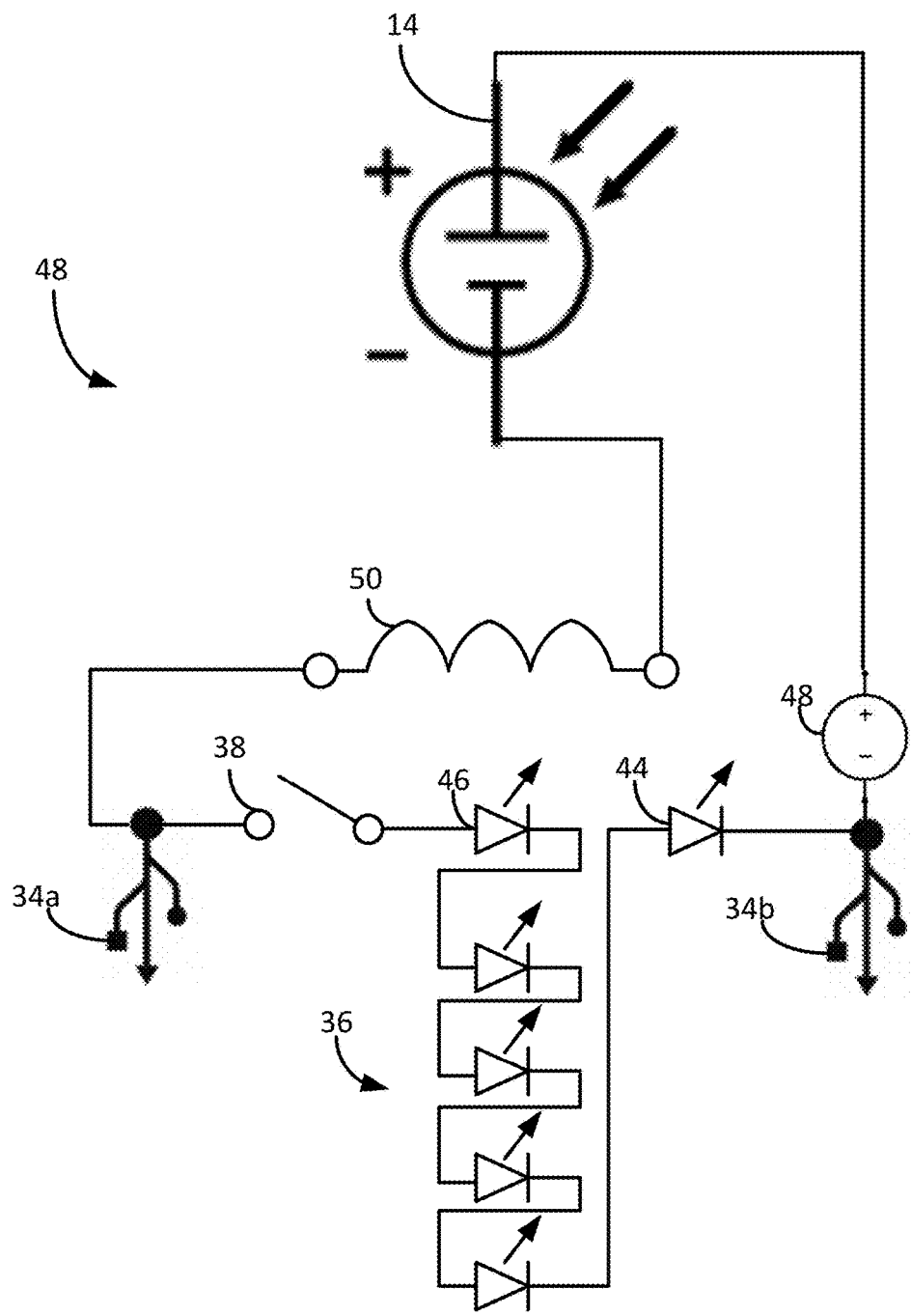
FIG. 5 shows a schematic of aspects of the invention.

Referring to FIG. 5, the power unit 48 is disposed in the electronic housing and includes a solar panel 14, induction coil 50, first USB port 34a, on/off switch, power indicators 36, indicator 44, a second USB 34b and battery 48. In operations, the solar panel receives light and converts it into energy. The energy can then be directed by the charging unit to the induction coil or battery. The device can then be charged from the induction coil of the battery. The battery can also be charged from an external source that can be attached to the electronic housing and charging unit. Devices can also be charged by connecting the device to the charging unit through connections such as the USB ports.

Figure 6:
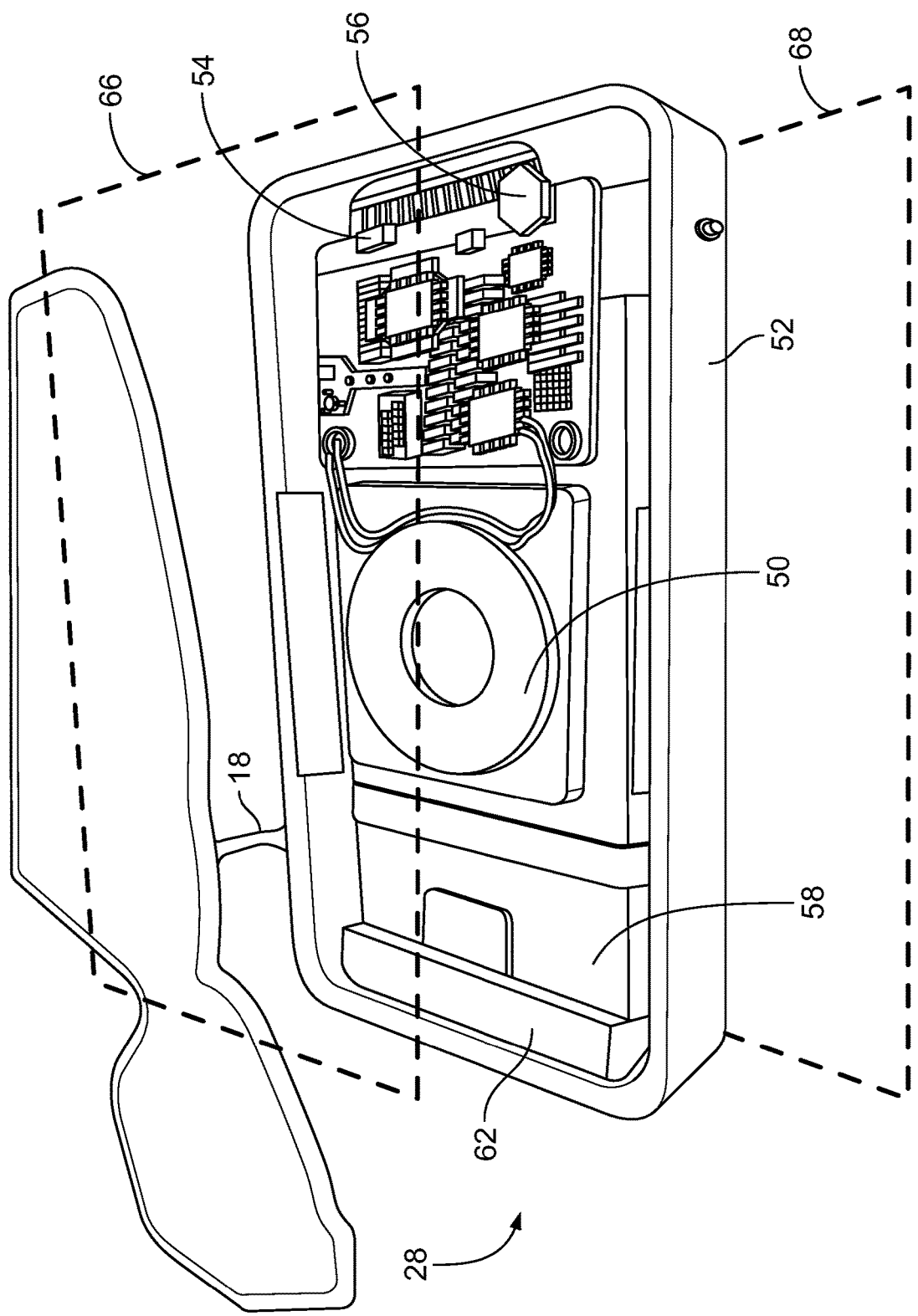
FIG. 6 shows a perspective view of aspects of the invention.

Referring to FIG. 6, the power unit 28 is shown having a perimeter 52 with an electrical connector 18 extending through the perimeter, the electrical connector being connected to a power unit controller 54 at one end and a solar cell at the other. The controller includes a power regulator 56 that can regulate power output received from various power sources such as the solar panel, battery 58 or external power source. The power output can be provided to the induction coil 50. The induction coil can have an insulation plate 60 disposed between the induction coil and the battery and can be affixed to the battery. Buffers 62 can be disposed between the battery and inner wall of the perimeter to prevent the battery from experiencing unnecessary movement within the perimeter. The perimeter can include a front cover 66 and back cover 68. In one embodiment, the front cover can be adjacent to the induction coil so that the front cover faces toward the device when the power unit is placed in the case and can be electronically transparent increasing the efficiency of the induction charging. In one embodiment, the back cover can be adjacent to the induction coil so that the back cover faces toward the device when the power unit is placed in the case and can be electronically transparent increasing the efficiency of the induction charging.

The power unit controller can include programmable logic that can:

determine if there is sufficient power being generated from the solar panel to provide power directly to the induction coil, and if so, direct power from the solar panel to the induction coil, and if not, direct power from the solar panel to the battery;

determine if there is sufficient power being generated from the solar panel to provide power directly from the solar panel to the induction coil, and if not, supplement the power being provided to the induction coil with power from the battery;

determine if a device is within sufficient proximity to the induction coil to receive power, and if not, direct power from the solar panel to the battery;

determine if there is sufficient power being generated from the solar panel to be provided directly to the induction coil and if not, supplement power to the induction coil from an external source;

determine if a device is within sufficient proximity to the induction coil to receive power, and if not, direct external power to the battery;

determine if there is sufficient power being generated from the solar panel to provide directly to the USB port, and if so, direct power from the solar panel to the USB port, and if not, direct power from the solar panel to the battery;

determine if there is sufficient power being generated from the solar panel to provide power from the solar panel to the USB port, and if not, supplement the power provided to the USB port with power from the external source; and determine if the device is sufficiently charged and if so, direct power from the solar panel or external source to the battery.

In one embodiment, the value of sufficiently charged can be configurable and can be 80% or greater in increments of 1%.

In one embodiment, the power unit can include two batteries. The computer readable instructions can include instructions to determine the charge level of a first battery and the charge level of a second battery. The computer readable instruction can supply charging power to one battery until it is about full and then supply charging power to the other battery. In one embodiment, the computer readable instructions can apply charging power to the lower charged battery until the charges are about equal, then apply power to the batteries simultaneously.

In one embodiment, the power unit controller is configurable so that sufficient power delivered from the solar cell or external power to the induction coil is sufficient for the induction coil to provide 3 watts or more. The amount of power that is sufficient can be configured in increments of 0.1 watts, for example, 3.0, 3.1, 3.2, etc.

In one embodiment, the sufficient distance between the device and the induction coil can be less than 40 mm and can be configured in units of 1 mm. The USB ports can be a mini port, micro port, type-A, type-B, type-C, or any combination.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A power supply comprising:
    a case having a power unit pocket and a device pocket;
    a power unit disposed in the power unit pocket including a battery, USB port, an induction coil and an indicator wherein the indicator is configured to indicate when the power unit is on, a charge level of the battery, when the power unit is charging a device, when the power unit is connected to an external power source, when a solar panel is providing power to the power unit, when the device is connected to the power unit, and any combination thereof;
    the solar panel carried by a front panel of the case and electrically connected to the power unit;
    the device pocket is configured to receive the device and provide charging power to the device from the induction coil, USB port, and any combination thereof;
    a program logic included in the power unit configured to:
        determine when the solar panel is providing sufficient power allowing the induction coil to provide 3 watts or more, and if the solar panel is providing sufficient power allowing the induction coil to provide 3 watts or more, direct power from the solar panel to the induction coil;
        direct power from the solar panel to the battery;
        determine when the device is sufficiently charged and if the device is sufficiently charged, direct power from the solar panel to the battery and away from the induction coil; and,
    a front cover included in the power unit that is electronically transparent.

2. The power supply of claim 1 wherein the program logic is configured to determine if the device is sufficiently charged, and redirect power from the external power source to the battery when the device is sufficiently charged.

3. The power supply of claim 1 wherein the device is sufficiently charged when a device charge is 80% or greater.

4. The power supply of claim 1 wherein a distance between the induction coil and the device is 5 mm or less.

5. The power supply of claim 1 wherein the power unit is removably carried by the case.

6. The power supply of claim 1 wherein the program logic is configured to direct power from the solar panel to the induction coil when the program logic determines that the induction coil can generate 3 watts of power or more when powered by the solar panel.

7. The power supply of claim 6 wherein the program logic is configured to direct battery power to the induction coil when the induction coil is not generating 3 watts or more.

8. The power supply of claim 1 wherein the program logic is configured to supplement the power delivered to the induction coil from the solar panel with power delivered to the induction coil from the battery.

9. The power supply of claim 1 wherein the power unit is configured to be removed from the case; and, a distance between the induction coil and the device is 2 mm or less when the device is disposed in the case.

10. A power supply comprising:
    a perimeter, a front cover, and a rear cover, wherein the front cover is electronically transparent;
    a battery carried by the perimeter;
    an induction coil carried by the perimeter;
    a USB port carried by the perimeter;
    a power unit controller carried by the perimeter and connected to the battery, induction coil and the USB port;
    a solar panel removably connected to the power unit controller and disposed external to the perimeter; and
    a program logic included in the power unit configured to direct power: from the battery to the induction coil, from an external source to the induction coil, from the solar panel to the induction coil, from the solar panel to the battery, from the external source to the battery, from the solar panel to the USB port, from the battery to the USB port, and any combination thereof.

11. The power supply of claim 10:
    wherein the USB port is a first USB port;
    a second USB port is carried by the power unit controller; and
    wherein the program logic is configured to direct external power received from the first USB port to the second USB port.

12. The power supply of claim 10 wherein a distance between the induction coil and a device received in a case defined by the perimeter, the front cover, and the rear cover is 5 mm or less.

13. The power supply of claim 10 wherein the program logic is configured to supplement power provided by the solar panel to the induction coil with power from the battery when the power provided by the solar panel is less than 3 watts.

14. The power supply of claim 10 including a case having a power unit pocket configured to receive the power unit and a device pocket configured to receive a device.

15. The power supply of claim 14 wherein the induction coil and device are positioned in the case so that a distance between the induction coil and the case is 5 mm or less.

16. The power supply of claim 10 wherein the solar panel is removably attached to a front panel of a case.

* * * * *